(12) United States Patent
Stelzer et al.

(10) Patent No.: US 11,312,570 B2
(45) Date of Patent: Apr. 26, 2022

(54) METHOD AND APPARATUS FOR VISUAL SUPPORT OF COMMISSION ACTS

(71) Applicant: KNAPP SYSTEMINTEGRATION GMBH, Leoben (AT)

(72) Inventors: Peter Stelzer, Gratkorn (AT); Josef Dax, Graz (AT); Manfred Grablechner, Trofaiach (AT)

(73) Assignee: KNAPP SYSTEMINTEGRATION GMBH, Leoben (AT)

( * ) Notice: Subject to any disclaimer, the term of this patent is extended or adjusted under 35 U.S.C. 154(b) by 299 days.

(21) Appl. No.: 14/155,804

(22) Filed: Jan. 15, 2014

(65) Prior Publication Data

US 2014/0188270 A1 Jul. 3, 2014

Related U.S. Application Data

(63) Continuation of application No. 12/554,600, filed on Sep. 4, 2009, now abandoned.

(30) Foreign Application Priority Data

Sep. 5, 2008 (AT) .............................. GM 477/2008

(51) Int. Cl.
*B65G 1/137* (2006.01)
*G06Q 10/08* (2012.01)
*G02B 27/01* (2006.01)

(52) U.S. Cl.
CPC ........... *B65G 1/1373* (2013.01); *B65G 1/137* (2013.01); *G02B 27/017* (2013.01);
(Continued)

(58) Field of Classification Search
CPC .. B65G 1/1373; B65G 1/137; B65G 2209/04; G02B 27/017; G02B 2027/014;
(Continued)

(56) References Cited

U.S. PATENT DOCUMENTS

| | | | |
|---|---|---|---|
| 5,745,387 A | 4/1998 | Corby, Jr. et al. | |
| 5,877,962 A | 3/1999 | Radcliffe | |

(Continued)

FOREIGN PATENT DOCUMENTS

| | | |
|---|---|---|
| DE | 34 34 572 | 3/1986 |
| DE | 3434572 | 3/1986 |

(Continued)

OTHER PUBLICATIONS

Observations of Opposer In European Opposition of EP 2 161 219 (Apr. 5, 2016) (w/ English language translation).

(Continued)

*Primary Examiner* — A. Hunter Wilder
*Assistant Examiner* — Joseph M Mutschler
(74) *Attorney, Agent, or Firm* — Greenblum & Bernstein, P.L.C.

(57) ABSTRACT

Device and method for visual technical support of manual order-picking processes through device with at least one (mobile) unit having optical sensing detection device, optical display device, data processing device and wireless data interface to data-processing system having product management software and connection device for active units. Each unit cyclically receives navigation information to produce directions on optical display device. Data for specific navigation results from comparing data from respective optical sensing detection device with stored reference/model data and position of current target of route-optimized list of goods transmitted to unit. Data for specific navigation is cyclically determined and transmitted to assigned unit and new navigation information for a next target on list does not occur until after optical detection of current target/placeholder replacement object by detection device, identification of detected object by the data processing device, and detec- (Continued)

tion and logging of goods from storage location to target location.

23 Claims, 4 Drawing Sheets

(52) U.S. Cl.
CPC ........ *G06Q 10/087* (2013.01); *B65G 2209/04* (2013.01); *G02B 2027/014* (2013.01); *G02B 2027/0138* (2013.01); *G02B 2027/0178* (2013.01)

(58) Field of Classification Search
CPC .... G02B 2027/0138; G02B 2027/0178; G06Q 10/087
See application file for complete search history.

(56) References Cited

U.S. PATENT DOCUMENTS

| | | | |
|---|---|---|---|
| 6,345,207 | B1 | 2/2002 | Nitta et al. |
| 6,711,458 | B1 | 3/2004 | Kofoed |
| 7,096,650 | B2 | 8/2006 | Van Dam |
| 7,143,041 | B2 | 11/2006 | Sacks et al. |
| 2002/0191002 | A1 | 12/2002 | Friedrich et al. |
| 2004/0138781 | A1 | 7/2004 | Sacks et al. |
| 2004/0153207 | A1 | 8/2004 | Peck |
| 2004/0164926 | A1* | 8/2004 | Schonlau ........... G02B 27/0172 345/8 |
| 2004/0183751 | A1* | 9/2004 | Dempski .............. G02B 27/017 345/8 |
| 2005/0071234 | A1* | 3/2005 | Schon ........................ G07F 7/02 705/22 |
| 2005/0140498 | A1 | 6/2005 | Bastian, II |
| 2006/0119761 | A1 | 6/2006 | Okuda |
| 2006/0136129 | A1 | 6/2006 | Yokozawa |
| 2006/0287759 | A1 | 12/2006 | Charych |
| 2007/0035563 | A1 | 2/2007 | Biocca et al. |
| 2009/0182499 | A1* | 7/2009 | Bravo .................... G01C 21/20 701/408 |

FOREIGN PATENT DOCUMENTS

| | | |
|---|---|---|
| DE | 102 15 885 | 10/2003 |
| EP | 1 799 554 | 6/2007 |
| EP | 1 862 406 | 12/2007 |
| KR | 10 2005 008 2348 | 8/2005 |
| WO | 2001/05686 | 1/2001 |
| WO | 02/17131 | 2/2002 |
| WO | 03/034397 | 4/2003 |
| WO | 03/078112 | 9/2003 |
| WO | 2006/029433 | 3/2006 |

OTHER PUBLICATIONS

European Opposition dated Jan. 22, 2015 against counterpart European Patent No. 2 161 219 with attached supporting Letter from Opposer's Counsel (Translation of Letter attached).
Abraham et al., "Soft Computing as Transdisciplinary Science and Technology," Proceedings of $4^{th}$ IEEE Int'l Workshop WSTST '05, Springer-Verlag Berlin Heidelburg New York (2005).
Mueck et al., "Augmented Reality applications for Warehouse Logistics," p. 1054-1062 (no date provided).
Mueck et al., "Augmented Reality appications for Warehouse Logistics", Soft Computting as Transdisciplinary Science and Technology. Advances in Soft Computing vol. 29, 2005, pp. 1053-1062.
R. Reif et al.; "Augmented & Virtual Reality applications in the field of logistics"; The Visual Computer; International Journal of Computer Graphics, Springer, Berlin, DE; Bd. 24, No. 11; Aug. 27, 2008; pp. 987-994.
B. Schwerdtfeger et al.; "Mobile Information Presentation Schemes for Supra-adaptive Logistics Applications"; Advances in Artificial Reality and Tele-Existence Lecture Notice in Computer Science; Springer, Berlin DE; Jan. 1, 2006; pp. 998-1007.
Dangelmaier et al., "AR Support for Picking," Dangelmaier et al., SimVis 2005, Magdeburg, Mar. 3, 2005.
Rupert Reif et al., Einsatz von Virtual und Augmented Reality: Studie zur menschorientierten Simulation und Prozessunterstutzung im logistischen Umfeld, 2007.
Rupert Reif et al., "Evaluierung eines Augmented Reality-unterstutzten Kommissioniersystems," IFF-Wissenschaftstage, Jun. 25, 2008.
"Augmented & Virtual Reality Applications in the field of logistics", Springer-Verlag, online publication on Aug. 27, 2008.
"Augmented Reality Applications for Warehouse Logistics", Springer 2005.
Internet expression as proof of Publication [article: "Augmented Reality Applications for Warehouse Logistics", Springer 2005] (2 pages).
"Augmented Reality—Vision order Wirklichkeit", Presentation of Apr. 12, 2007, 36 pages.
Auszüge eines Internetausdrucks der Veroffentlichungen des Lehrstuhls fml der TUM nach Jahren Sortiert.
Auszüge aus "Vehicle Location and Navigation Systems", Artech House 1997, ISBN 0-89006-861-5.
"Augmented and Virtual Reality based Training in the field of Logistics", Lecture in Peking on Sep. 10, 2007.
Excerpts from conference proceedings to E9 [article: "Evaluierung eines Augmented Reality-unterstlitzten kommissioniersystems", IFF-Wissenschaftsage 25.—Jun. 26, 2008, S. 254-260].
Presentation "Pick-by-Vision—Vision oder Wirklichkeit?", 30 Folien Forum CeMAT 2008, May 28, 2008.
Excerpts from FORUM CeMAT 2008—Program as proof for E11 [article: Presentation "Pick-by-Vision—Vision oder Wirklichkeit?", 30 Folien Forum CeMAT 2008, May 28, 2008].
"The Omnidirectional Attention Funnel: A Dynamic 3D Cursor for Mobile Augmented Reality Systems", Proceedings of the $39^{th}$ Hawaii International Conference on System Sciences, 2006, IEEE.

\* cited by examiner

METHOD AND APPARATUS FOR VISUAL SUPPORT OF COMMISSION ACTS

CROSS-REFERENCE TO RELATED APPLICATIONS

The present application is a Continuation U.S. application Ser. No. 12/554,600 filed Sep. 4, 2009 that claims priority under 35 U.S.C. § 119(a) of Austrian Patent Application No. GM 477/2008 filed Sep. 5, 2008, the disclosures of which are expressly incorporated by reference herein in their entireties.

BACKGROUND OF THE INVENTION

1. Field of the Invention

The present invention relates to a method for the visual technical support of manual order-picking processes through a device with at least one mobile unit, having an optical sensing detection device, an optical display device, a data processing device and a data interface for wireless connection to a stationary electronic data-processing system, which, in addition to product management software, has a connection device for all active mobile units.

2. Discussion of Background Information

A plurality of different systems are currently used for order-picking in warehouses. In addition to static provision (man-to-goods systems), dynamic provision (goods-to-man systems) by means of high-bay storage, storage carousel installations, flow through racks and paternoster installations is being used with increasing frequency. The latter has the advantage of a smaller space requirement and the reduction of work for recognition, picking and confirmation. The disadvantages are the high expenditure in terms of infrastructure and machinery, the high cost of the overall system and poor access in the event of breakdown. A motor breakdown can mean order-picking comes to a standstill.

Technologies that became known as pick-to-light or pick-by-voice are often used. In the first case, an order picker at the storage location is notified via a device by display instruments which goods and which quantity he should remove; after removal the user confirms by pressing a button. Errors or unauthorized removal of goods are not avoidable here. The expenditure for the display instruments or devices is also considerable. In addition, stationary screens with position information, type of goods and quantity linked to with an administrator file are used at various points in space for retrieval. Pick-by-voice renders possible hands-free maneuvering via acoustic commands; a microphone makes it possible to report for confirmation. In principle, four elements of technologies of this type have already been disclosed, in particular by research studies by Munich Technical University, Chair for materials handling engineering, material flow and logistics. This also includes pick-by-vision systems in the test phase. These cover data helmets for the display of information superimposed in the field of view, such as optical highlighting of a storage compartment, visually supported route-finding and route information. Further known devices, such as augmented-reality devices, are used for head-mounted displays, in particular in various applications such as in computer games, in simulators for process steps or inspection or data comparison tasks.

DE 102 15 885 A1 describes a method for automatic process control with an augmented-reality system with camera, data goggles and logging device. This method and the device therefor are used chiefly for logging and analysis of manipulation operations for correct implementation.

Also cited as prior art is the use of augmented reality as a substitute for an assembly manual, for example in aircraft assembly.

SUMMARY OF THE EMBODIMENTS

Embodiments of the invention build on this prior art to create a method and a device that is suitable for supporting the basic functions of order pickup through navigation. These basic functions are, e.g.; take a predetermined container or a specific transport aid; go to a predetermined article location, remove there the predetermined number of this article and place it in the container or transport aid; go the next article location, etc.; and finally bring the target container to the container target location. The user should be able, without special knowledge, to take a support device from a location, e.g., a loading station. It should be possible to carry out the rest of the functions through the device clearly and with effective monitoring quickly and easily in a route-optimized and time-optimized manner. Interruptions and continuations by other employees as well as the exchange of container or auxiliary device should be possible without error for order picking at any time. Route optimization and collision avoidance are further aspects of the invention. Likewise, it should be possible to immediately insert sudden priority tasks easily and without time being lost. It should be possible for the different functions to be carried out by one or more employees. It should also be possible for a list to be worked through by several employees or order pickers at the same time without duplications.

According to the invention, a method is proposed for the visual technical support of manual order picking operations. For this purpose a device is used with at least one mobile unit and a stationary central data-processing system. The data-processing system and the mobile unit can communicate via a wireless connection, wherein necessary data are exchanged. The mobile unit has an optical sensing detection device for this purpose, in order to detect its surroundings. An optical display device in the mobile unit is used to display information; a data processing device is used to process information for the display and to prepare for the data transmission based on the optical sensor detection. The stationary data-processing system is equipped with goods management software, which can access the data of all of the active mobile units via the wireless connection. The important factor thereby is that each mobile unit cyclically receives navigation information and this is transmitted in the form of directions, in particular (directional) arrows, via the optical display device. To this end the method requires that the data for the specific navigation based on a data comparison of the data from the respective optical sensing detection device of each mobile unit are compared to reference data or model data in the data-processing system or also stored in the mobile unit in order to clearly define the location of the clearly identified mobile device. With the aid of these data the software of the data-processing system or that of the mobile unit, based on the position of the current target object known to the system, can determine the route information or the product identification and display it on the mobile unit addressed.

As a further basic feature, the new navigation information for the next object of an assigned list of goods is to occur only after the optical detection of the current object and clear identification of the same. The important factor thereby is the clear detection and logging of the order-picking operation of a goods article from the storage location to the target location. If the requested product is not at the target location, a place holder replacement object, e.g., a printed sheet with clear identification, must be placed in the transport aid. This can contain information for the product recipient. The system will receive feedback on a product shortfall.

Expediently, before the start of the navigation for a new combination of goods or addition of goods, a navigation to the transport aid to be currently used, in the first case empty or in the second case already partially filled, occurs and if a complete combination of goods is interrupted early, a position of the transport aid is transmitted to the stationary data-processing system and stored for the subsequent continuance and completion of the order, or after successful completion of the order, the navigation of the transport aid containing the complete combination of goods to the common target position occurs. A transport aid, e.g., a basket or transport cart, is normally used for a combination of goods. It is advantageous to guide a newly registered user by navigation to the transport aid to be currently used. This can be empty or already partially filled. The latter is advantageous if a task list is interrupted, e.g., in the case of breaks, the end of a day's work or shift changeover. If a transport aid with all of the goods according to the task list has been assembled according to the goods management program of the data-processing system, it is advantageously navigated to the target position. A target position can thereby be different for each order.

A detection of unauthorized movements of an object from its storage location or from the transport aid or of the transport aid itself with the aid of the optical sensing detection device and its evaluation with the aid of the software of the stationary data-processing system is advantageous for control and monitoring of the work processes. Measures to prevent errors, such as warnings via the optical display device through corresponding error code transmission are thus possible.

Ideally and due to its educational effect, an acoustic alarm is triggered in the event of optically detected errors.

For support or control in the detection of the position and orientation, inertial sensors for complete detection of a movement and orientation of an order picker are advantageous. The inertial sensors can be calibrated by fixed optically detected markers, the position of which is known to the system. Conversely, this makes it possible to check movable optically detected objects with respect to their desired location. If a calibrated inertial sensor is applied to the hand of the order picker and if he is guided to the position of a movable system component or a product, the location of which is not the desired position, the software recognizes this and can likewise apply corrective measures. Thus, for example, a product can have fallen off a shelf; the location of the correct storage position is transmitted to the mobile unit upon contact.

Embodiments of the invention are directed to a device for carrying out the above-described method. The device has at least one mobile unit. Several mobile units of this type can be used in a warehouse simultaneously. They communicate with a central data-processing system. The mobile unit has an optical sensing detection device, an optical display device, a data-processing device and software for image data processing and is equipped with a wireless data interface for data transmission. The data transmission is always carried out with the central data processing device, e.g., via a wireless local area network (WLAN) or a Bluetooth connection. In addition to these devices known per se, as a third component the geometry of the warehouse and the complete detection of all dimensions and product positions in a virtual model is the decisive feature of the invention. Space, product and devices must form one unit. In addition to geographic arrangements of warehouse facilities and/or optically detectable conditions through shape, color and/or pattern, poster-like attachments can be suitably designed in order to ensure for as many objects as possible a clear determination of the position and the orientation in a warehouse through the optical sensing detection device. Geometric similarity algorithms, e.g., image analysis methods, are used for this purpose in the central and/or in the mobile data processing device.

Advantageously, a pattern-scanner with laser, in particular a barcode scanner, can be used as an optical sensing detection device. The current position and orientation information must thereby be determined in installations on the floor, on walls, the product or shelves by patterns, in particular barcodes, by the data processing device of the mobile unit or after transmission of the pattern information by the central data-processing system. The laser of the detection device could theoretically also be used for the optical display device.

For support, passive transponders (radio frequency identification tags or RFID tags) can be attached in the warehouse for position analysis. Then a transponder reader device must be provided in the mobile units. The code of the transponder permits inferences to be made on the position, orientation and/or designation of the product, based on the product management software.

For augmented reality it is advantageous if the optical sensing detection device is a camera module. With the aid of image data analysis, supported by installations on the floor, on walls, shelves, storage locations or on the product, current position and orientation or product information can be determined from colors, shapes and patterns—either already in the mobile unit or after image transmission by the central data processing device. The video image detected equipped with the additional information of the navigation can be transmitted to at least one video display.

In principle, the optical display device can have light-emitting diodes, a display, in particular a display of the liquid crystal display (LCD) or organic light emitting diode (OLED) type, or combinations thereof. The important factor thereby is that the display device is suitable for showing the direction of travel in coded form or by directions, in particular in the form of directional arrows.

A laser projector is also suitable as an optical display device. This is suitable for projecting directions on surrounding objects, in particular a floor, or in the case of corresponding identification, directly marking the respective target object by irradiation.

The integration of an inertial sensor, in particular a rotation rate sensor, is advantageous. This makes it possible in addition to detect movement or rotational movement. The correction of the direction in the display device can thereby also be carried out between two optical sensing position and orientation detections.

If a laser scanner is used as an optical sensing detection device, it is particularly advantageous to also use the laser via its deflection devices to display the information or directions, in that it is possible to switch backwards and forwards between display and scan mode. If conversely a laser projector is used, with suitable deflection the laser beam thereof can also serve as a component for a laser scanner.

An augmented reality representation on the display device is also advantageous. The actually detected data, in particular video data directly or virtual data constructed from certain characteristic values, with geometric information on the warehouse and its structure are thereby linked to augmented reality data. The user in particular of video goggles or a data helmet is thus given a virtual view of the surrounding area with or without integration of the real images. Additional information is embedded in this virtual display.

For three-dimensional perception, it is advantageous if the data of the optical sensing detection device are transmitted either by two sensors spaced apart or through image conversion based on the stored geographic data of the warehouse structure into a three-dimensional image for both eyes of the viewer. A suitable optical display device is, for example, 3D spectacles; shutter glasses render possible a three-dimensional depth effect for the viewer. To this end two calculated or detected viewing angles of the virtual or real image are used with additional information and the reproduction thereof for both eyes of the viewer. To support focusing and representation that is correct in terms of viewing angle, the movement of the eyes can be detected.

Accordingly, embodiments of the present invention are directed to a method for the visual technical support of manual order-picking processes through a device with at least one mobile unit, having an optical sensing detection device, an optical display device, a data processing device and a data interface for wireless connection to a stationary electronic data-processing system, which, in addition to product management software, has a connection device for all active mobile units. The method is characterized in that each mobile unit cyclically receives navigation information, which is transmitted in the form of directions, in particular arrows, via the optical display device. The data for specific navigation is based on a data comparison of data from the respective optical sensing detection device with reference data or model data in the data-processing system or the mobile unit and a position of a current target object of an assigned route-optimized list of goods transmitted by the data processing system to the mobile unit. Moreover, the data for the specific navigation is cyclically determined and transmitted addressed to the assigned mobile unit and the new navigation information for the next object of the list of goods does not occur until after the optical detection of the current target object or of a placeholder replacement object by the detection device and clear identification of the same by the data processing device and clear detection and logging of the order-picking process of a goods article from the storage location to the target location.

According to embodiments of the invention, before the start of navigation for a new combination of goods or supplementation of goods, a navigation to the transport aid to be currently used, in the first case empty or in the second case already partially filled, can occur and if complete combination of goods is interrupted early, a position of the transport aid may be transmitted to the stationary data-processing system and stored for the subsequent continuance and completion of the order, or after successful completion of the order, the navigation of the transport aid containing the complete combination of goods to the common target position occurs.

In accordance with other embodiments, a movement not authorized by the stationary data processing system of an object from its storage location or from the transport aid or of the transport aid itself may be detected with the optical sensing detection device and likewise transmitted to the data-processing system. The software can recognize the error and triggers corresponding warning messages to the optical display device of the mobile unit by transmitting an error code. Further, an acoustic alarm can be triggered in the case of optically detected errors.

According to still other embodiments, inertial sensors with complete detection of a movement and orientation of an order picker can be used for support or monitoring in the detection of the position and orientation. The inertial sensors may be optionally calibrated by fixed optically detected markers, and conversely, movable optically detected objects are checked with respect to their desired location.

Embodiments of the invention are directed to a device for carrying out the above-described method. The device includes at least one mobile unit with optical sensing detection device, optical display device, data processing device and software for image data processing and data transmission and with wireless data interface to a central electronic data processing device or data processing system. Geographic arrangements and/or optical conditions through shape, color and/or pattern, in particular by poster-like attachments are suitably designed and are clearly described with complete geographic precision and stored in the system in order to ensure for as many objects as possible that are detectable by the optical sensing detection device during an order picking, a clear determination and assignment of the position and the orientation with the aid of geometric similarity algorithms in the central and/or in the mobile data processing device.

According to other embodiments of the instant invention, the optical sensing detection device can be a pattern scanner with laser, in particular a barcode scanner, and the current position and orientation information in attachments on the floor, on walls, goods or shelves by pattern, in particular barcodes, can be determined by the data processing device of the mobile unit or after transmission of the pattern information by the central data processing system.

Moreover, passive transponders (RFID tags) can be attached to support position analysis, and transponder reader devices can be provided in the mobile unit. A code of the transponder may permit inferences to be made on the position, orientation and/or designation of the product.

In accordance with still other embodiments, the optical sensing detection device may be a camera module, through which the current position and orientation or product information can be determined from colors, shapes and patterns with the aid of image data analysis, supported by attachments on the floor, on walls, shelves, storage locations or on the product, by the mobile unit. The determination may optionally occur after image transmission by the data processing system.

In other embodiments, the optical display device can be formed by light-emitting diodes, a display, in particular a liquid crystal display (LCD) or organic light emitting display (OLED), or combinations thereof. The optical display device may be suitable for showing the direction of travel in coded form or by directions, in particular in the form of directional arrows, which indicate the correct route, regardless of the orientation of the mobile unit.

In still further embodiments of the invention, the optical display device can be formed by a laser projector, which projects directions on surrounding objects, in particular a floor, and upon recognition, marks the respective target object.

According to still other embodiments, an inertial sensor may be provided for additional detection of a movement or rotary movement of the mobile unit.

In accordance with still yet other embodiments of the present invention, the laser device of the laser projector can be used additionally as a scanner laser, the reflected light of which an optical sensor captures with code information of code markings, in particular barcode markings. At least one of the data processing devices can link actually detected data, in particular video data and construed virtual data, to augmented reality data and processes them via the optical display device for combined display. Further, the data of the optical sensing detection device, either by two sensors spaced apart or through image conversion based on the stored geographic data, through a suitable optical display device can render possible a three-dimensional depth effect for the viewer, in particular by detecting and/or generating offset views for each eye.

Other exemplary embodiments and advantages of the present invention may be ascertained by reviewing the present disclosure and the accompanying drawing.

BRIEF DESCRIPTION OF THE DRAWINGS

The present invention is described based on the following practical embodiments. They show.

DETAILED DESCRIPTION OF THE EMBODIMENTS

Figure 1:
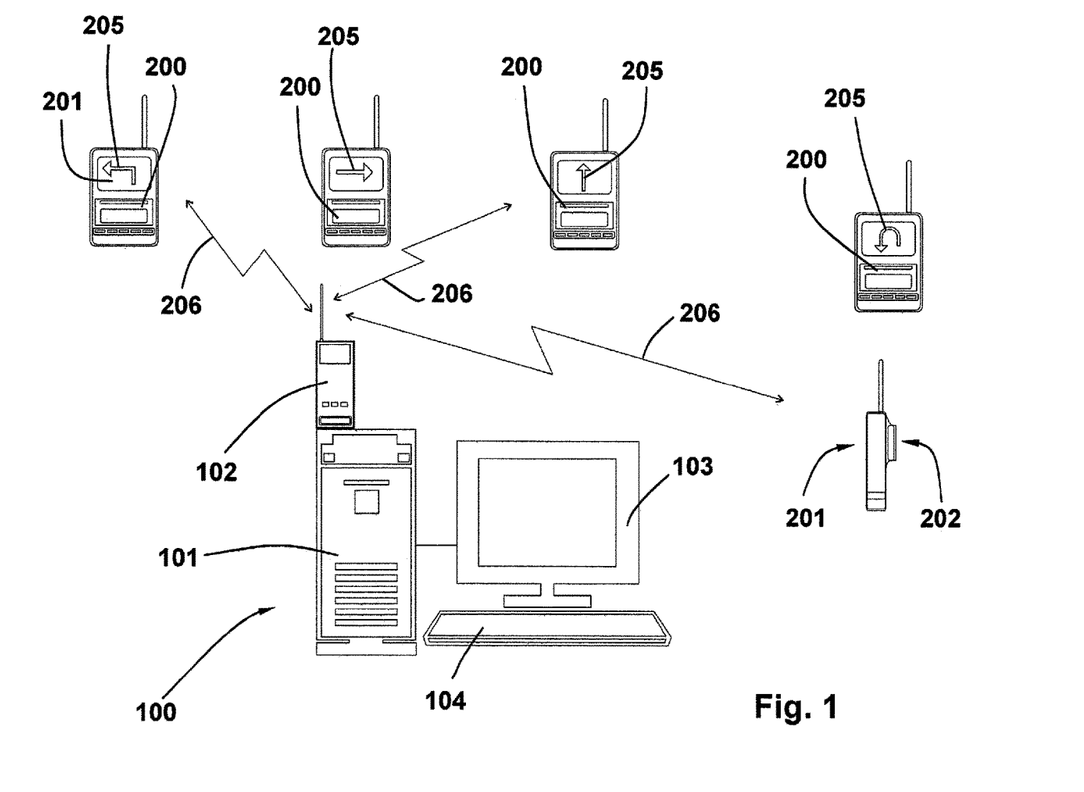
FIG. 1 illustrates an example of the device according to the invention with mobile hand devices.

FIG. 1 shows the expenditure in terms of equipment for the pick-by-vision method as a first example. A data-processing system 100 comprises a computer 101 and a communication interface or connection device 102 for wireless connection to mobile units 200. A keyboard 104 makes it possible to enter data, in particular to select functions of a goods management system. Many things are carried out in an automated manner, for example, customer orders. The inventory can be retrieved constantly updated. Bottlenecks are to be avoided. The goods management software can inform a user about all currently active mobile units via a monitor 103. Further retrievable information includes current users, number of correct goods access operations, number of error messages, order picker start and end times, missing products, order receipts, tracking the order status, determining a possible delivery date, overstaffing or understaffing. The mobile units 200 have an optical display device 201, an optical sensing detection device 202 and a device for data processing and communication via a wireless connection 206.

A sequence is, for example, shown briefly, as follows: a recently hired, untrained order picker is asked to take a mobile unit 200 from a charging station for storage batteries. Usually, it is fully charged. If the charge condition is unsuitable, a block can prevent removal until the optimum charge condition has been reached. The order picker takes a suitable device and switches on the mobile unit 200. The software powers up and the wireless interface awaits the logon sequence. The mobile unit 200 is recognized by the data processing device 100 based on a cyclical scan of new logons. After detection of the new device by the control center, the current equipment level is increased. A user identification is requested on the display device 201 of the mobile unit 200. To this end, for the new order picker either his face was linked to his data in the system or an identification card with a personal barcode, possibly as a sticker, sewn-on badge or imprint attached to protective clothing or a helmet. The order picker holds the optical sensing detection device 202, e.g., a camera, against his face or the code, and the system transmits the release to the mobile unit 200 for task performance. In the data processing device 100 the device number is linked to the user identity, at the same time a time stamp occurs for the start of work. The data processing device 100 assigns the next goods list to the current mobile unit 200 according to a priority plan. First the order picker is welcomed by name via the display. There is the option here of ending the work promptly in the event of an identification error. The code might be incorrect, the wrong work clothing has been put on or the mobile unit 200 was accidentally pointed at a different order picker. The logon can be repeated by restarting (switching on and off). However, the incorrect logon is logged. Once the welcome has been completed, the order picker needs only to follow the instructions of the mobile unit 200 for the route. First, the order picker is guided to a transport aid. Arrows 205 on the display show the way. Prominent objects or intersections in the route can also be displayed in the optical display device 201. The transport aid to be selected is clearly assigned by the control center or data processing system 100. This also makes it possible to continue a combination of goods that has been started but not completed, even by a different order picker. When the transport aid is reached, the instruction to take the same is transmitted. If the transport aid is clearly identified by the detection device, which can also be carried out by a barcode, and moved away from the location, the target of the next element of the task list of the user is transmitted to the mobile unit 200. The directions are given again. Location and target are two geographic points, which are used via software to the mobile unit 200 or in the control center or data processing system 100 for an automatic routing process through the warehouse by the shortest route. As a result, the mobile unit 200 indicates the direction by arrows 205, the movement of the order picker through the warehouse is detected by optical sensing. The camera on the mobile unit 200 renders possible a comparison of image data with stored and geographically assigned warehouse positions and orientations. A certain barcode sign can thus precisely define the location. The orientation can additionally be detected by rotary sensors, e.g., according to the gyroscope principle, so that a viewing angle defined for the alignment of the camera to the barcode sign is taken into account accordingly in the indication of direction in the event of a tilt. At the target location, the optical sensing detection device 202 recognizes the target object. The display indicates the object by suitable emphasis. If the correct object is moved into the transport aid, the detection device recognizes this, e.g., since two image components are made congruent. The operation is completed, the next routing occurs. If the mobile unit 200 is switched off, the current order-picking status with the time log for the user is stored and integrated into the population of all orders. If all of the elements of a task list have been completed, that is, placed in the transport aid, the guidance of the filled transport aid to the target location occurs. Guidance to another transport aid occurs. Then further actions, such as packing and shipping of the goods can be carried out at the target location for the transport aid. The deletion of all goods is carried out in a similar manner through the detection of the removal from the transport aid by staff authorized to do so. Since the control center or the data processing system 100 knows the precise number of goods deposited, a packer can here also verify again the correct order picking with the aid of the device presented. The transport aid number is again released in the system for a new list of goods.

If an order picker takes the wrong object in error, a warning is given via the display device 201 or acoustically. The error is logged, any correction likewise.

Figure 2:
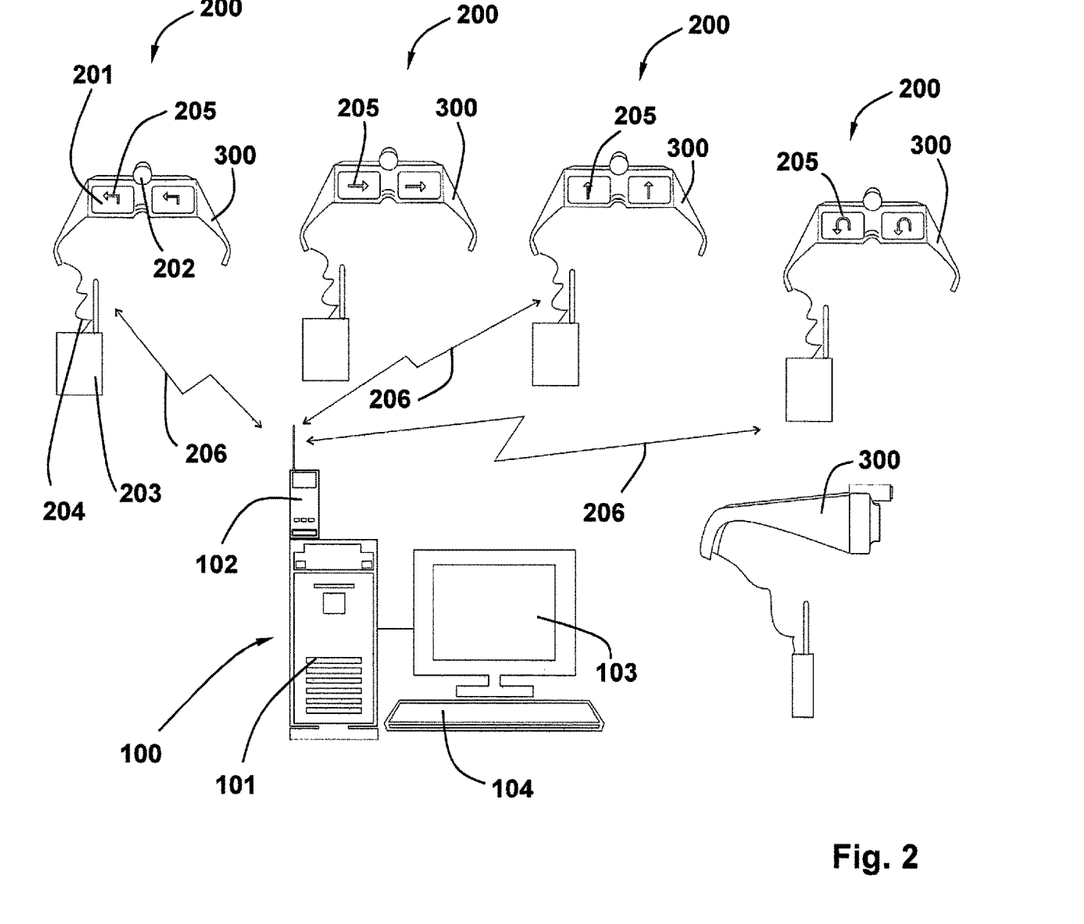
FIG. 2 illustrates a further exemplary embodiment of the device according to the invention with video glasses.

If the mobile unit 200, as shown in FIG. 1, is embodied as a hand unit, work is somewhat limited. This can be remedied by a detachable attachment of the device to a transport aid. However, the fixing of the device to the body, e.g., by a belt, is advantageous, and ideally the display device 201 is integrated into data goggles 300, as shown in FIG. 2. Future goggles render possible very light embodiments, so that freedom of movement is restricted only slightly. The field of view should remain as large as possible.

Figure 3:
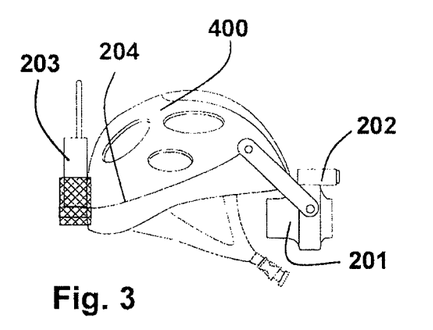
FIG. 3 illustrates a data helmet for use as a mobile unit.

FIG. 3 shows a typical data helmet with a video monitor device or optical display device 201 similar to an electronic viewfinder for the display of augmented reality, integrating lines of sight from an optical sensing detection device 202 embodied as a camera. A transmission device 203 can be attached to a helmet 400 and is connected to a detection and display device via a wiring 204. A closed unit thus results, which can easily be put on or taken off.

Figure 4:
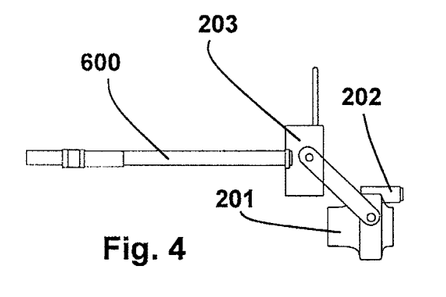
FIG. 4 illustrates a head-hand type head mount for a further embodiment of the mobile unit.

FIG. 4 shows a headband 600 in side view for attachment to the head. Devices for image detection, image reproduction and data processing and communication or an optical sensing detection device 202, an optical display device 201 and a transmission device 203 are mounted on the forehead here.

Figure 5:
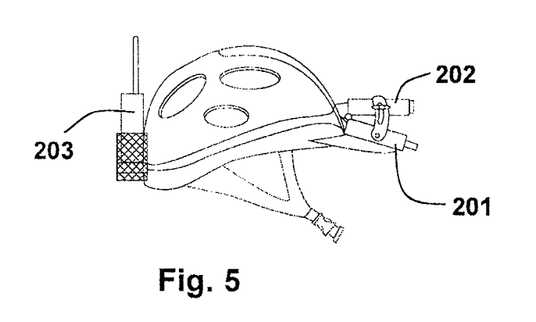
FIG. 5 illustrates a helmet with projection device as a display device.
Figure 6:
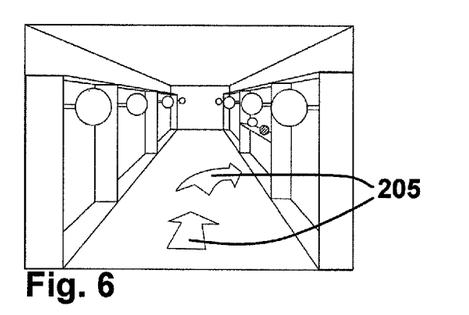
FIGS. 6 through 9 illustrate fields of view of an order picker with a typical order-picking operation.
Figure 7:
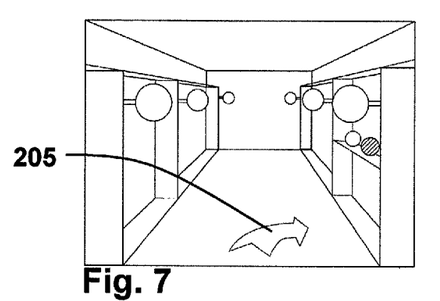
Figure 8:
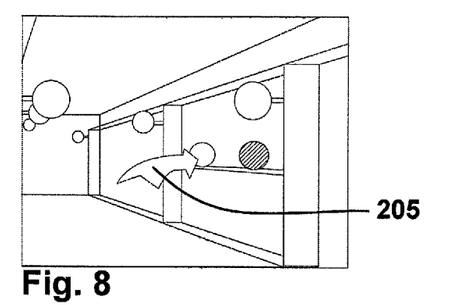
Figure 9:
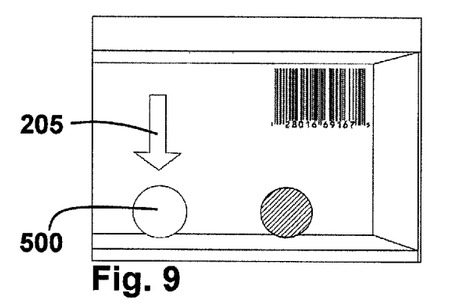

A special embodiment of the mobile unit 200 is shown in FIG. 5. The headpiece shows here an image detection device 202 in the form of a video camera and a display device 201 in the form of a laser projector. The latter projects directional arrows onto the floor in front of the user. A correctly recognized article of goods can also be indicated with the aid of a projector, e.g., by a circle. However, the prerequisite for this is that the projection beam is located in the field of view of the camera. Preferably the laser projector permits a change of the projection direction from obliquely to the ground to straight ahead parallel to the line of sight of the detection device, in order to achieve a clear feedback.

FIGS. 6 through 9 show possible representations during a product navigation, either through the display or the line of sight of the order picker. The shelf labels, for example, are used for orientation here. The letters A through H give the system the current location. The next list product is a white ball or a target object 500. This is located in the vicinity of a marker G. A route planning (central or in the mobile unit 200) determines the route information and produces the (directional) arrows 205. If the order picker follows the arrow 205, the view of the optical sensing detection device 202 then changes from FIG. 7 to that in FIG. 8 and finally to that in FIG. 9. The product is recognized and marked and can be removed in a controlled manner.

The predominant but not restricted field of application relates to warehouses of wholesalers or mail-order companies as well as storage facilities or interim storage facilities of manufacturers or suppliers. With the method or the device according to the invention, for this the combination of goods inside a warehouse is thereby possible even by employees with no knowledge of the configuration of the warehouse and no knowledge of the location and position of the goods to be combined, wherein in particular several order pickers can work simultaneously.

The invention claimed is:

1. A method for the visual technical support of manual order-picking processes through a device with a mobile unit having an optical sensing detection device, an optical display device, a data processing device and a data interface for wireless connection to a stationary electronic data-processing system, wherein the stationary data-processing system includes product management software and a connection device for the mobile unit, the method comprising:
    transmitting an order comprising an assigned list of goods from the data-processing system to the mobile unit;
    cyclically receiving navigation data, which is transmitted in the form of directions, on the optical display device of the mobile unit,
    wherein the navigation data for the mobile unit is based on a comparison of data from the optical sensing detection device of the mobile unit with:
        reference data or model data stored in the data-processing system or in the mobile unit; and
        a position of a current target object of the assigned list of goods of the mobile unit; and
    not transmitting navigation information for a next object of the assigned list of goods of the specific mobile device until:
        the current target object or a placeholder replacement object for the current target object is detected by the optical sensing detection device of the mobile device;
        the data processing device identifies the detected current target object or placeholder replacement object for the current target object; and
        the movement of the detected current target object or placeholder replacement object for the current target object from a storage location to a target location is detected and logged.

2. The method according to claim 1, wherein, before starting navigation for a new listing of goods of the specific mobile device or supplementation of the list of goods of the mobile device, the method further comprises at least one of:
    transmitting navigation information to a transport aid to be currently used, which is empty or at least partially filled,
    when the order picking process is interrupted prior to completion of the order, transmitting and storing a position of the transport aid to the stationary data-processing system for subsequent continuance and completion of the order, and
    after successful completion of the order, transmitting navigation information to direct the transport aid containing the completed order to a common target position.

3. The method according to claim 1, wherein the mobile unit is associated with a transport aid and the method further comprises:
    detecting movement, which is not authorized by the stationary data processing system, of an object from its storage location or from a transport aid or movement of the transport aid with the optical sensing detection device of the mobile unit associated with the transport aid; and
    transmitting the detected movement to the data-processing system, which recognizes the unauthorized movement of the object and transmits an error code to trigger warning messages to the optical display device of the mobile unit associated with the transport aid.

4. The method according to claim 3, wherein an acoustic alarm is triggered in an event of optically detected errors.

5. The method according to claim 1, wherein inertial sensors with complete detection of a movement and orientation of an order picker are used for supporting or monitoring a position and orientation of the order picker.

6. The method according to claim 5, further comprising calibrating the inertial sensors via fixed optically detected markers, and checking movable optically detected objects with respect to their desired location.

7. The method according to claim 1, wherein the assigned list of goods is a route-optimized list of goods from the data-processing system.

8. A device for carrying out visual technical support of manual picking processes of an order, comprising:
a mobile unit with optical sensing detection device, optical display device, data processing device and software for image data processing and data transmission and with a wireless data interface to an electronic data processing system,
wherein at least one of geographic arrangements or optical conditions through at least one of shape, color and pattern are located within an environment in which the system operates and geographical locations of these at least one of geographic arrangements or optical conditions through at least one of shape, color and pattern within the environment are stored in the data processing system, and
wherein, in processing the order, the optical sensing detection device is configured to detect the at least one of geographic arrangements or optical conditions, whereby a determination of a position and orientation of the optical sensing detection device is made using image analysis of the detected geographic arrangements or optical conditions in at least one of the data processing system or the mobile unit data processing device.

9. The device according to claim 8, wherein the optical sensing detection device comprises a pattern scanner with a laser and the current position and orientation information of the optical sensing detection device is determinable based upon the geographic arrangements and a pattern of the optical conditions, which can be arranged as attachments on the floor, on walls, goods or shelves, the pattern being determined one of:
by the data processing device of the mobile unit, or
by the data processing system, after transmission of the pattern information by the optical sensing detection device.

10. The device according to claim 8, further comprising passive transponders attached to support position analysis, and the mobile unit further comprises transponder reader devices, wherein a code of the transponder permits inferences to be made on at least one of the position, orientation or designation of the objects.

11. The device according to claim 8, wherein the optical sensing detection device comprises a camera module, through which the current position and orientation of the optical sensing detection device or product information is determined from colors, shapes and patterns with the aid of image data analysis, supported by attachments on the floor, on walls, shelves, storage locations or on the product, by the mobile unit.

12. The device according to claim 8, wherein the optical display device comprises at least one of a light-emitting diode (LED) display, a liquid crystal display (LCD) or organic light emitting display (OLED), or combinations thereof, wherein the optical display device is configured for showing a direction of travel in coded form or by directions, which indicate a correct route, regardless of the orientation of the mobile unit.

13. The device according to claim 8, wherein the optical display device is formed by a laser projector, which projects directions on at least one of surrounding objects or a floor, and upon recognition, marks the respective target object.

14. The device according to claim 8, wherein an inertial sensor is provided for detection of a movement or rotary movement of the mobile unit.

15. The device according to claim 13, wherein the laser device of the laser projector is configured as a scanner laser, in which an optical sensor captures reflected light with code information of code markings.

16. The device according to claim 15, wherein the code marking comprise barcode markings, and wherein at least one of the data processing device and the data processing system links actually detected data to augmented reality data and processes them via the optical display device for combined display.

17. The device according to claim 15, wherein the data of the optical sensing detection device, either by two sensors spaced apart or through image conversion based on the stored geographic data, is displayed by the optical display device with a three-dimensional depth effect for the viewer.

18. The device according to claim 8, wherein the optical conditions comprise poster-like attachments.

19. The device according to claim 9, wherein the optical sensing detection device comprises a barcode scanner and the position and orientation information includes barcodes.

20. The device according to claim 10, wherein the passive transponders comprise RFID tags.

21. The device according to claim 11, wherein the current position and orientation of the optical sensing detection device or product information is determined after image data is transmitted by the data processing system.

22. The device according to claim 16, wherein the actually detected data comprises at least one of video data and construed virtual data.

23. The device according to claim 17, wherein the three-dimensional depth effect for the viewer is achieved by at least one of detecting or generating offset views for each eye.

* * * * *